No. 852,069. PATENTED APR. 30, 1907.
A. E. LE BLANC.
LAND MARKER.
APPLICATION FILED NOV. 12, 1906.
2 SHEETS—SHEET 1.
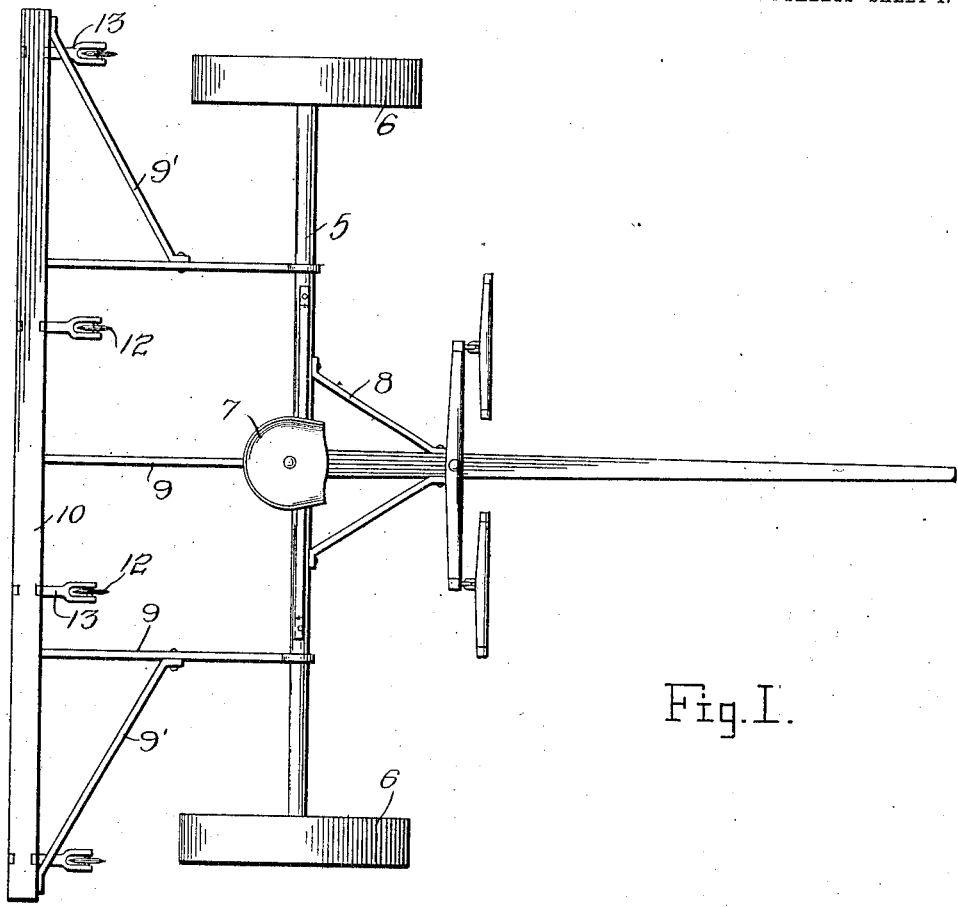
Fig. I.
Fig. 2.
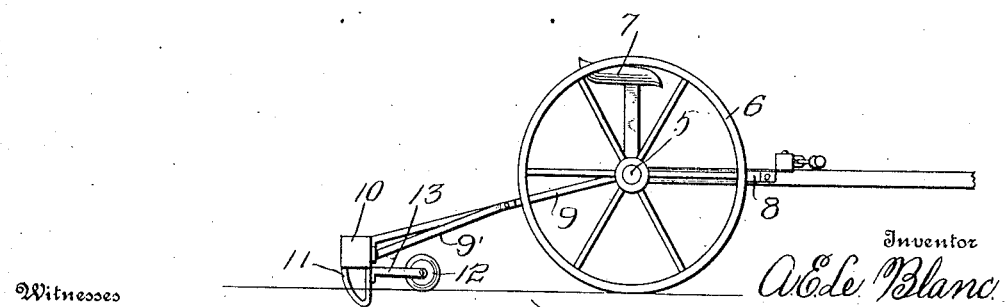
Witnesses
Inventor
A. E. Le Blanc
By
Attorneys No. 852,069. PATENTED APR. 30, 1907.
A. E. LE BLANC.
LAND MARKER.
APPLICATION FILED NOV. 12, 1906.
2 SHEETS—SHEET 2.
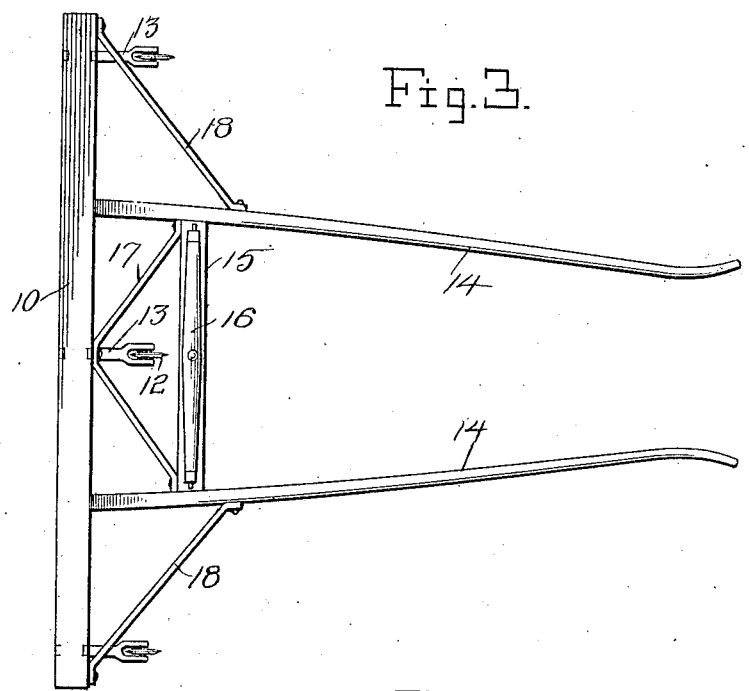
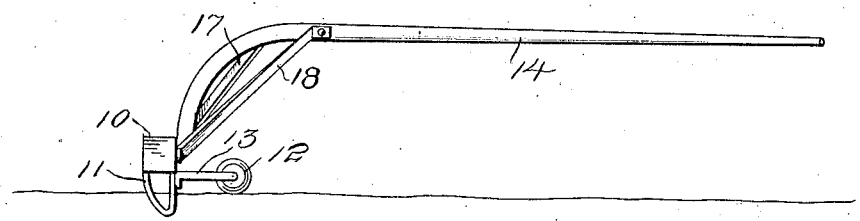
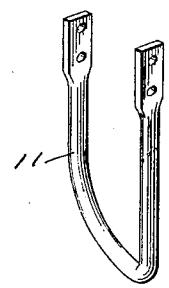

UNITED STATES PATENT OFFICE.

ARMAND E. LE BLANC, OF HOUMA, LOUISIANA.

LAND-MARKER.

No. 852,069.   Specification of Letters Patent.   Patented April 30, 1907.

Application filed November 12, 1906. Serial No. 343,127.

*To all whom it may concern:*

Be it known that I, ARMAND E. LE BLANC, a citizen of the United States, residing at Houma, in the parish of Terrebonne, State of Louisiana, have invented certain new and useful Improvements in Land-Markers; and I do hereby declare the following to be a full, clear, and exact description of the invention, such as will enable others skilled in the art to which it appertains to make and use the same.

This invention has relation to farm implements for marking out land for planting corn or other seeds or grain that are planted in rows; and it furthermore relates to field-marking implements that are contrived to mark a plurality of rows at one crossing of the field.

It is the object of my invention to provide a land-marker of the kind mentioned that shall at once be simple in construction and efficient to a maximum degree for the purposes for which it is devised.

The invention is shown as embodied in the implement portrayed in the annexed drawings, forming a part of this specification, and in view of which the improvements will first be described with respect to their construction and mode of operation, and then be pointed out in the subjoined claims.

Of the said drawings—Figure 1 is a top plan view. Fig. 2 is a side elevation. Fig. 3 is a top plan view showing a modification. Fig. 4 is a side elevation of Fig. 3, and Fig. 5 is a detail view of the plow.

Similar numerals of reference designate similar parts or features, as the case may be, wherever they occur.

In the drawings, referring more particularly to Figs. 1, and 2, 5 designates the axle, provided on its ends with ground wheels 6, and supporting a seat 7 above the axle through the intervention of suitable supporting rods and braces. 8 is the pole or tongue connected with and suitably braced from the axle and bearing a double-tree and single-tree for hitching a team to the pole.

10 designates the marker-beam, that, for mere example, may be supposed to consist of a four-by-four inch timber twenty-five feet long. This beam is pivotally connected with the axle through the medium of draft-rods 9 which have their upper ends bent into rings surrounding the axle as the pivoting means. At their lower rear ends the rods 9 are connected with the beam 10 in any suitable way. Brace rods 9' extend from the outer ends of the beam to the outer brace rods 9 for the purpose of stiffening or strengthening the structure.

11 designates the forks or plows that may be of any suitable form to effect the marking of the land, and that have the rear upper ends of their shanks secured in the beam 10, their efficient portions being curved down and forward so as to enter the ground and form a furrow or mark for the rows in which the seeds are to be planted. As herein represented the plows 11 are of skeleton form, being made from rod-iron, their points being bent into a V shape, and the ends of their shanks being secured in the beam, as stated.

12 designates disk-cutter journaled in the forward forked or bifurcated end of a rod, 13, secured at its rear end in the beam and extending forward of the plow or marker 11 so that the cutter 12 may be advanced on the line to be followed by the point of the marker, 11, and cut in the grass and vines in its way and thus assist the markers to perform their work perfectly.

In Fig. 3, I have shown a modified form of the implement in which it is represented as a drag, without sulky wheels, axle, seat, pole and its equipments, but in which shafts 14 for one horse are immediately connected to the marker-beam, which latter is provided with markers and vine-cutters precisely as before described. The shafts shown are provided with a cross-bar 15 on which is arranged a whiffletree 16. Brace-rods 17 are connected with the shafts and extended inward and connected with the beam, and similar brace-rods 18 are connected with the shafts and extended outward to the beam to brace and strengthen the shafts laterally.

In the preferred form of the implement, (see Figs. 1 and 2) when the latter is not in use, or is on the road, the beam 10 with its equipments may be turned up.

In the use of the modified form, it will be observed that, for the sake of economy, the shafts may be taken from a buggy or other vehicle and applied to the beam when the implement is in use, and be taken off and returned to their former and general use, so that it is not necessary to construct special and permanently-attached shafts for the improved device.

The disks or cutters 12 are relatively thin flat plates with sharp edges so that they may fulfil their office of simply cutting vines and the like in advance of the markers. They make no preliminary furrow, gutter or groove, but leave the marking or furrowing to be effected by the forks or plows unhampered by vines and the like.

The beam, particularly in the modified form where but one horse or mule may be used to work the implement may be shorter than has been described, and be constructed with at least one marker less than is shown, where the ground is heavy or for other reasons the work is harder than one-horse can do. No objection exists, however, to substituting a pole for the shafts and working two horses with the modified form.

The simplicity and complete efficiency of the implement are points of importance in its construction and mode of use.

What is claimed is—

1. The combination, with the axle, wheels, pole and their equipments, comprising a sulky for agricultural implements, of a ground-marker consisting of a beam connected with the axle, a plurality of marking devices connected in spaced relationship with the beam, rods connected at their rear ends with the beam and projected forward, one in front of each marking device, cutting disks journaled on the forward ends of said rods and constructed and arranged to operate on a line in front of that followed by the points of the markers.

2. The combination, with the axle, wheels, pole and their equipments, comprising a sulky for agricultural implements, of a ground-marker consisting of a beam connected with the axle, a plurality of marking devices connected in spaced relationship with the beam, rods connected at their rear ends with the beam and projected forward, one in front of each marking device, cutting disks journaled on the forward ends of said rods and constructed and arranged to operate on a line in front of that followed by the points of the markers, and means connecting the beam swivelly with the axle, to allow the former to be raised and turned over out of working position without moving or interfering with the axle.

3. The combination, with the axle, wheels, pole and their equipments, comprising a sulky for agricultural implements, of a ground marker consisting of a beam connected with the axle, a plurality of marking devices consisting of rod-iron bent to V-shaped form and connected in spaced relationship with the beam, rods connected at their rear ends with the beam and markers and projected forward, one in front of each marking device, cutting disks journaled on the forward ends of said rods and constructed and arranged to operate on a line in front of that followed by the points of the markers.

In testimony whereof, I affix my signature, in presence of two witnesses.

ARMAND E. LE BLANC.

Witnesses:
J. WILFRED LE BLANC,
LEON J. MENVILLE.